United States Patent
Alth

[15] 3,670,191
[45] June 13, 1972

[54] SINGLE-PHASE MOTORS

[72] Inventor: Max Alth, 6 Tamarack Road, Port Chester, N.Y. 10573

[22] Filed: Jan. 11, 1971

[21] Appl. No.: 105,381

[52] U.S. Cl. .................................................310/163, 310/211
[51] Int. Cl. .....................................................H02k 19/14
[58] Field of Search..................310/162, 163, 41, 46, 268

[56] References Cited

UNITED STATES PATENTS

| | | | |
|---|---|---|---|
| 2,378,556 | 6/1945 | Jeffers | 310/268 X |
| 1,957,281 | 5/1934 | Neureuther | 310/163 |
| 2,873,395 | 2/1959 | Kober | 310/268 X |
| 3,576,455 | 4/1971 | Ingenito | 310/163 |

*Primary Examiner*—D. X. Sliney

[57] ABSTRACT

Rotor comprises a conductive disc pierced by a plurality of iron cores spaced a distance from edge of disc and equidistant from each other. Stator comprises a plurality of U-shaped solenoids positioned about rotor, with disc approximately centered within the U-shape. Flux is propagated in lines parallel to rotor shaft and in a series of relatively narrow bands tangential to disc radius.

Alternately, flux lines parallel to rotor shaft, perpendicular to rotor and directed in relatively narrow bands at an angle tangential to to rotor disc circumference are generated by means of a single coil set within a circular iron pole piece having a U-shaped cross section with slots cut into legs of the U, which is directed inward and positioned above and below the rotor.

10 Claims, 8 Drawing Figures

SINGLE-PHASE MOTORS

BACKGROUND TO PRESENT DISCLOSURE

Present-day single phase motors depend upon a number of starting aids:

1. Manual. This is generally a single disc type motor. It is given a turn at start by hand.
2. Split-phase starting winding. The stator (or rotor) is provided with a secondary winding positioned at a radial angle to the main winding (s). The starting winding distorts the main field and so produces starting torque. Generally, the starting winding is switched out of the circuit by one means or another when the rotor achieves speed.
3. Capacitor start. A capacitor is placed in series with the starting winding. This may be left in or switched out during running.
4. Shaded pole. A low resistance, shorted turn is placed on several stator poles. Induction produces a counter field in the shorted turn. Said counter field distorts the main field, causing it to strike the rotor at an angle and thus to start.

The present invention provides a single phase, induction motor that is self starting because of the discrete and directional field produced by its stator windings, stator pole shapes and positioning.

ADVANTAGES OF THE PRESENT INVENTION.

The present invention has no split-phase winding, no switches, no starting capacitors, no shorted turn coil in the stator field to reduce efficiency. Instead, the present invention provides a high-starting torque, high efficiency, single phase induction motor that starts with the introduction of alternating current and adjusts itself to line frequency and load.

PRINCIPLE OF OPERATION

Figure 1:
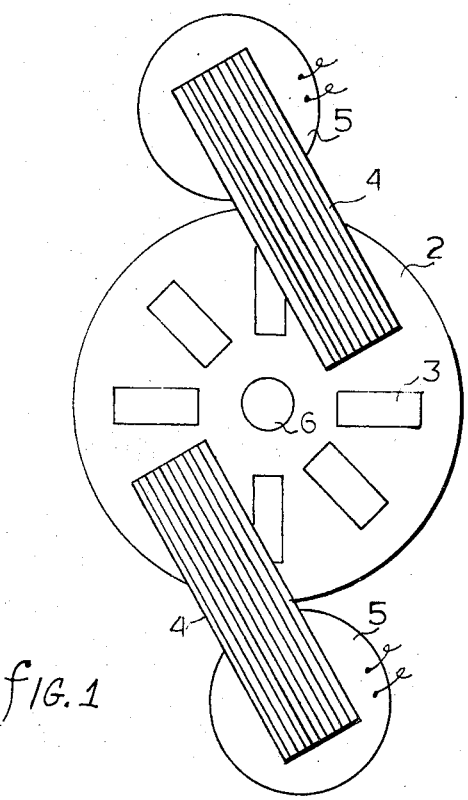
FIG. 1 is a plan view of a simple form of the present invention.
Figure 2:
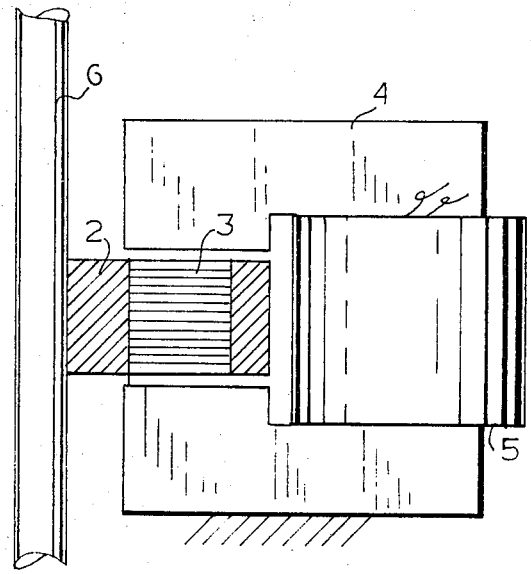
FIG. 2 is a sectional view of the same motor.

Referring to FIG. 2, 5 is a coil wound on iron core 4. The ends of this folded solenoid encompass a portion of the rotor. Said rotor consists of shaft 6 supporting an aluminum (or copper) disc 2 which in turn encompasses a number of iron cores 3. These consist of iron laminations. When an AC current is fed to coil 5, a field is produced which emanates at the coil and proceeds outwards, striking the conductive rotor. As the rotor is effectively a shorted turn about each of the laminated cores 3, a counter magnetic field is set up in the conductive rotor. Referring to FIG. 1, as the folded solenoid is positioned at an angle oblique to the radii of the rotor, the stator field, opposing the induced field in the rotor and about the cores, acts to repel the core. Thus the rotor is caused to turn.

Figure 3:
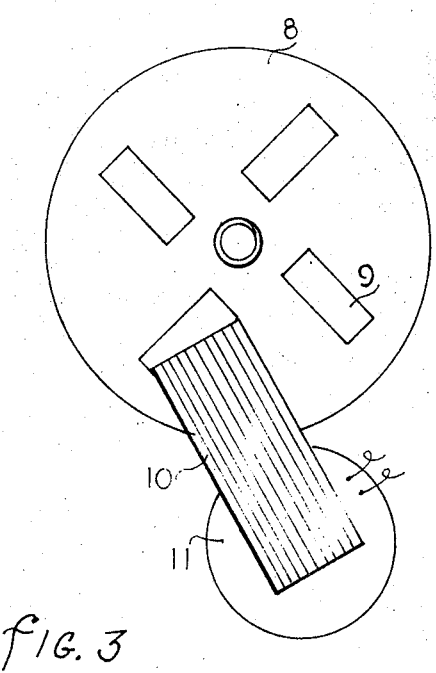
FIG. 3 shows how the angle of the rotating magnetic core and the angle of the field may be varied.

In FIG. 3, the angle of the stator pole 10 has been shifted somewhat in relation to the cores. The cores 9 are no longer radial to the center of the disc. This arrangement provided improved starting torque. In the same figure, 8 is the conductive disc, 11 is the stator coil. Only one stator coil and pole (top of the pair) is shown. Any number that can be accommodated, from one upwards may be utilized.

Figure 4:
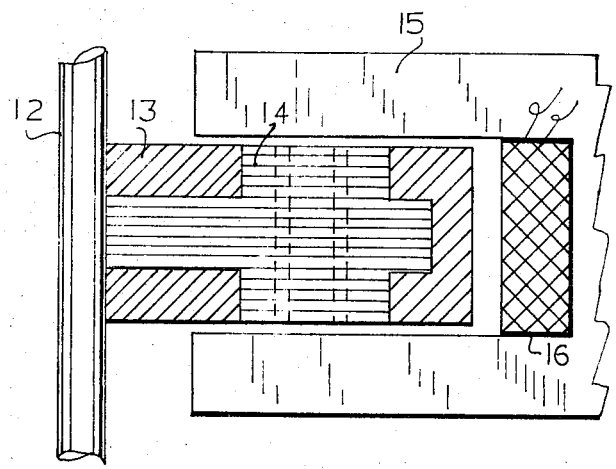
FIG. 4 shows how the rotor may be cast on an iron core made of iron laminations.

FIG. 4 shows the same arrangement of parts, however, a different type of rotor construction is shown. The rotor comprises a number of punched laminations fastened orthogonally to the shaft 12. To provide a definite pole, a number of individual laminations are riveted in place. These are indicated at 14. The shorted turns consist of aluminum 13 (or copper) cast in place on the aforementioned laminations. 15 is the U-shaped, folded solenoid, 16 is the stator coil.

Figure 5:
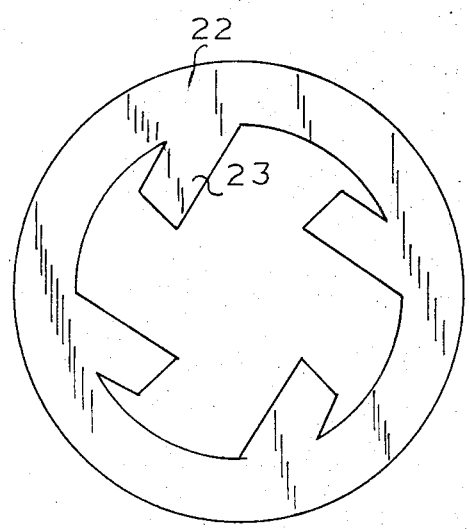
FIG. 5 is a plan view of the motor stator shown in FIG. 6.
Figure 6:
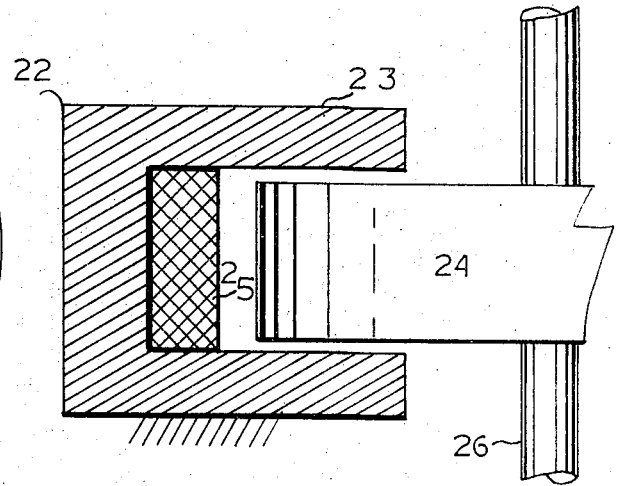
FIG. 6 (in concert with FIG. 5) shows how a single coil may be used for the stator field.

FIGS. 5 and 6 illustrate a different approach to generating the same, obliquely directed, confined stator fields produced by the U-shaped solenoids in FIGS. 1,2,3, and 4. Referring to FIG. 6, 26 is the motor shaft, 24 is the rotor, 25 is a single coil that encircles the entire rotor, 22 is the rear, external edge of the stator, 23 is an arm or pole cut into that stator. For simplicity, none of the many possible means of assembling this stator is shown in the drawing. Neither are any bearing means shown. FIG. 6 is the top view of the stator. Note how the pole arm, 23 is produced.

Figure 7:
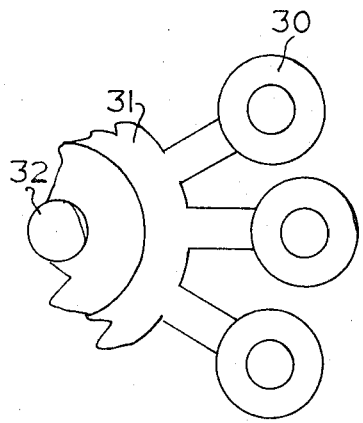
FIG. 7 shows how individual arms may be used to support and position individual rotor coils.
Figure 8:
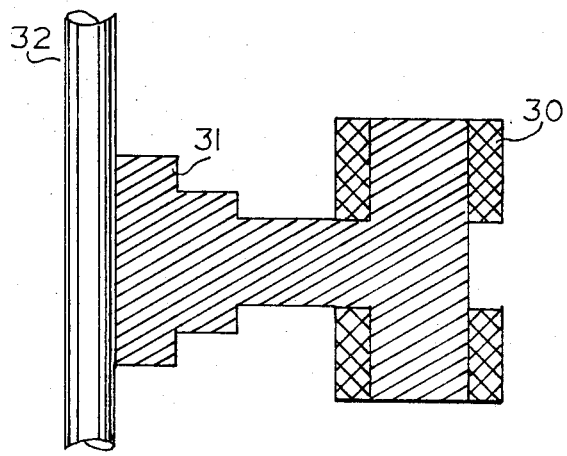
FIG. 8 shows rotor coils made of a coil of wire, with its ends joined (shorted coil).

FIGS. 7 and 8 show how a rotor for the device may be fashioned from an iron casting, 31, mounted on a shaft, 32, and how shorted-turn rotor winding may be positioned ,30, on the cores of the casting. The stator may be either the single unit shown in FIGS. 5 and 6 or the individual coils and U-shaped stator assemblies shown in the other figures.

Having described my invention and its manner of manufacture, this is what I claim as new and novel and desire to secure by Letters Patent:

1. A single phase induction motor comprising an electrically conductive means, generally circular in outline and fastened to a shaft means passing orthogonally through its center, a plurality of magnetically susceptible core means piercing said conductive means, said cores generally positioned a distance inward from the edge of said conductive means and generally equidistant from each other and generally circular about said shaft means, said core means cooperating and responding to said flux to provide synchronization, a plurality of flux generating means comprising U-shaped solenoids with arms passing above and below said conductive means, said arms directed at an angle generally oblique to radii of said shaft means.

2. A device as claimed in claim 1 wherein said electrically conductive means comprises a single disc of electrically conductive metal.

3. A device as claimed in claim 1, wherein said electrically conductive means comprises conductive metal cast and positioned on a magnetically permeable rotor means.

4. A device as claimed in claim 1, wherein said electrically conductive means comprises a plurality of conductive metal coils positioned on magnetic cores positioned and supported by means connected to said shaft means.

5. A device as claimed in claim 1, wherein said magnetically susceptible core means comprise magnetic, iron laminations, generally rectangular in shape, grouped to form cores, the length of said rectangles positioned radial to the center of said rotor.

6. A device as claimed in claim 1, wherein said magnetically susceptible cores comprise a plurality of punched and shaped laminations of magnetically susceptible sheets of metal, said laminations fastened to said shaft, and said laminations also forming cores for said conductive material and metal.

7. A device as claimed in claim 1, wherein said magnetically susceptible cores comprise castings of shapes suitable to support said conductive means and suitable to be attached to said shaft means.

8. A device as claimed in claim 1, wherein said flux generating and directing means comprises an annulus with a U-shaped cross section, said U-arms directed inwards, said arms, cut and shaped to provide flux directing arms, said arm being distinct and directed obliquely inwards , and having a suitable coil in its central core.

9. A device as claimed in claim 1, wherein said flux generating and directing means comprises an annulus formed of a plurality of punched and shaped magnetically susceptible laminations, said shapes formed and selected and positioned to make a plurality of inward directed arms, said arms directed at an angle other than radial to said shaft means, and in addition, said flux generating means encompasses a single coil within the center of its annulus and between its plurality of pole arms.

10. A device as claimed in claim 1, wherein said flux generating and directing means comprise a plurality of U-shaped magnetically susceptible cores, formed on a plurality of suitable metal laminations, and having individually an electrical coil, said coils being connected to the source of alternating current.

* * * * *